US006808271B1

(12) United States Patent
Kurematsu

(10) Patent No.: US 6,808,271 B1
(45) Date of Patent: Oct. 26, 2004

(54) PROJECTION TYPE DISPLAY APPARATUS

(75) Inventor: Katsumi Kurematsu, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/680,770

(22) Filed: Oct. 6, 2000

(30) Foreign Application Priority Data

Oct. 12, 1999 (JP) .......................................... 11-289465

(51) Int. Cl.[7] .................... G03B 21/14; G03B 21/22; G03B 21/28; G02F 1/07; G03H 1/26
(52) U.S. Cl. ........................... 353/70; 353/76; 353/78; 353/79; 353/99; 359/460; 359/457; 359/20; 359/22
(58) Field of Search ................................ 353/69–70, 74, 353/76–79, 98–99; 359/20, 22, 457, 460

(56) References Cited

U.S. PATENT DOCUMENTS

| 4,854,674 A | * | 8/1989 | Wreede ........................... 359/3 |
| 5,032,022 A | * | 7/1991 | Sato et al. ..................... 353/69 |
| 5,048,949 A | * | 9/1991 | Sato et al. ..................... 353/77 |
| 5,220,363 A | * | 6/1993 | Sato et al. ..................... 353/69 |
| 5,302,983 A | * | 4/1994 | Sato et al. ..................... 353/69 |
| 5,408,282 A | * | 4/1995 | Nagashima et al. ........... 353/77 |
| 5,422,691 A | * | 6/1995 | Ninomiya et al. ............. 353/69 |
| 5,442,413 A | * | 8/1995 | Tejima et al. .................. 353/69 |
| 5,820,240 A | | 10/1998 | Ohzawa ......................... 353/70 |
| 5,833,339 A | * | 11/1998 | Sarayeddine .................. 353/20 |
| 5,942,157 A | * | 8/1999 | Sutherland et al. .......... 252/582 |
| 6,123,425 A | | 9/2000 | Ohzawa ......................... 353/69 |

FOREIGN PATENT DOCUMENTS

| JP | 04-057014 | 2/1992 |
| JP | 06-148566 | 5/1994 |
| JP | 2893877 | 5/1999 |
| JP | 11-142962 | 5/1999 |

* cited by examiner

Primary Examiner—Russell Adams
Assistant Examiner—Magda Cruz
(74) Attorney, Agent, or Firm—Morgan & Finnegan, L.L.P.

(57) ABSTRACT

In order to achieve a great improvement in light utilizing efficiency, a projection type display apparatus for obliquely projecting an original image onto a screen includes a first projection optical system for projecting light from an original picture and forming an intermediate image having trapezoid distortion caused therein, a second projection optical system for obliquely projecting the light from the intermediate image onto a surface for projection so as to cause converse trapezoid distortion, and re-imaging it, and a light deflecting element for deflecting the optical axis of the first projection optical system so that the optical axis of the first projection optical system deflected by the light deflecting element is made to substantially coincide with the optical axis of the second projection optical system.

15 Claims, 6 Drawing Sheets

PROJECTION TYPE DISPLAY APPARATUS

BACKGROUND OF THE INVENTION

1. Field of the Invention

This invention relates to a projection type display apparatus, and particularly to a projection type display apparatus attaining a great improvement in light utilizing efficiency or the thinning of the apparatus in an oblique projection system.

2. Related Background Art

An apparatus of this kind is disclosed, for example, in Japanese Patent No. 2893877. The construction of a basic optical system according to this example of the prior art is shown in FIG. 6 of the accompanying drawings. In this example of the prior art, a trapezoidal intermediate image is formed on a reflecting mirror 49, and it is obliquely projected onto a screen 53 by a projection lens 40. As regards the trapezoid rate of this intermediate image, the trapezoid rate of an inverted trapezoid is set so as to just cancel trapezoid distortion created by the oblique projection onto the screen 53.

In the above-described example of the prior art, however, the trapezoid distortion is cancelled and corrected, but the principal ray of reflected light reflected by the reflecting mirror 49 on which the intermediate image is formed does not coincide with the optical axis of the projection lens 40 at all and therefore, as shown in FIG. 6, only the other divergent light beam than the principal ray passes to the projection lens 40. Therefore, the quantity of light which can be utilized is slight, and this example of the prior art has a problem in that light utilizing efficiency becomes very bad.

SUMMARY OF THE INVENTION

It is an object of the present invention to solve the above-noted problem peculiar to the prior art and to provide, in a projection optical system for correcting trapezoid distortion occurring to an intermediate image by oblique projection, a super-thin projection type display apparatus which can achieve a great improvement in light utilizing efficiency and can accomplish the projection of a large image plane.

It is also an object of the present invention to provide a projection type display apparatus which comprises:

- a first projection optical system for obliquely projecting light from an original picture onto a predetermined surface, the first projection optical system forming the intermediate image of the original picture on or near the predetermined surface;
- a second projection optical system for obliquely projecting the light from the predetermined surface onto a surface for projection and imaging it thereon; and
- light deflecting means disposed between the first projection optical system and the second projection optical system for deflecting the light emerging from the first projection optical system;
- wherein the optical axis of the first projection optical system is deflected by the light deflecting means so as to substantially coincide with the optical axis of the second projection optical system.

In the foregoing, "near" appearing in "the first projection optical system forming the intermediate image of the original picture on or near the predetermined surface" means a range within which the intermediate image can be regarded as being formed substantially on the predetermined surface, including a case where the positions of "the predetermined surface" and "the intermediate image" slide a little in parallelism to each other, and a case where the two intersect with each other. That is, it means that when an observer disposes a screen or the like on the predetermined surface and observes the intermediate image of the original picture, the positions of the predetermined surface and the intermediate image are near to each other to such a degree that the intermediate image can be observed within a range in which a feeling of resolution is sufficiently obtained to the observer.

In one aspect of the invention, the light deflecting means is disposed on the predetermined surface.

In further aspect of the invention, the light deflecting means is constituted by a transmission type diffracting optical element.

In further aspect of the invention, the light deflecting means is constituted by a reflection type diffracting optical element.

In further aspect of the invention, the light deflecting means is a hologram.

In further aspect of the invention, the light deflecting means is disposed at or near the position of the intermediate image.

In further aspect of the invention, the surface for projection has an eccentric Fresnel lens.

In further aspect of the invention, the surface for projection has a plurality of eccentric Fresnel lenses.

In further aspect of the invention, the surface for projection has a lenticular lens.

In further aspect of the invention, the light deflecting means has the light deflecting action and the light condensing action.

In further aspect of the invention, the projection type display apparatus has a plurality of vertically or substantially vertically disposed reflecting mirrors.

In further aspect of the invention, the projection type display apparatus is of a rear projection type projecting an image from the rear onto the surface for projection.

DETAILED DESCRIPTION OF THE PREFERRED EMBODIMENTS

In the so-called optical trapezoidal correction oblique projection optical system as described above, for example, a diffracting optical element is utilized as a medium for propagating a trapezoidal intermediate image, whereby light emerging from the intermediate image can be directed in the direction of the optical axis of a main projection lens (a second projection optical system) and further, it becomes possible to achieve a great improvement in light utilizing efficiency. Also, by providing a plurality of vertically or substantially vertically disposed plane mirrors downstream of the projection lens, it becomes possible to achieve super-thinning and large image plane in a rear projection display apparatus above all. A specific embodiment thereof will be shown below.

Embodiment

Figure 1:
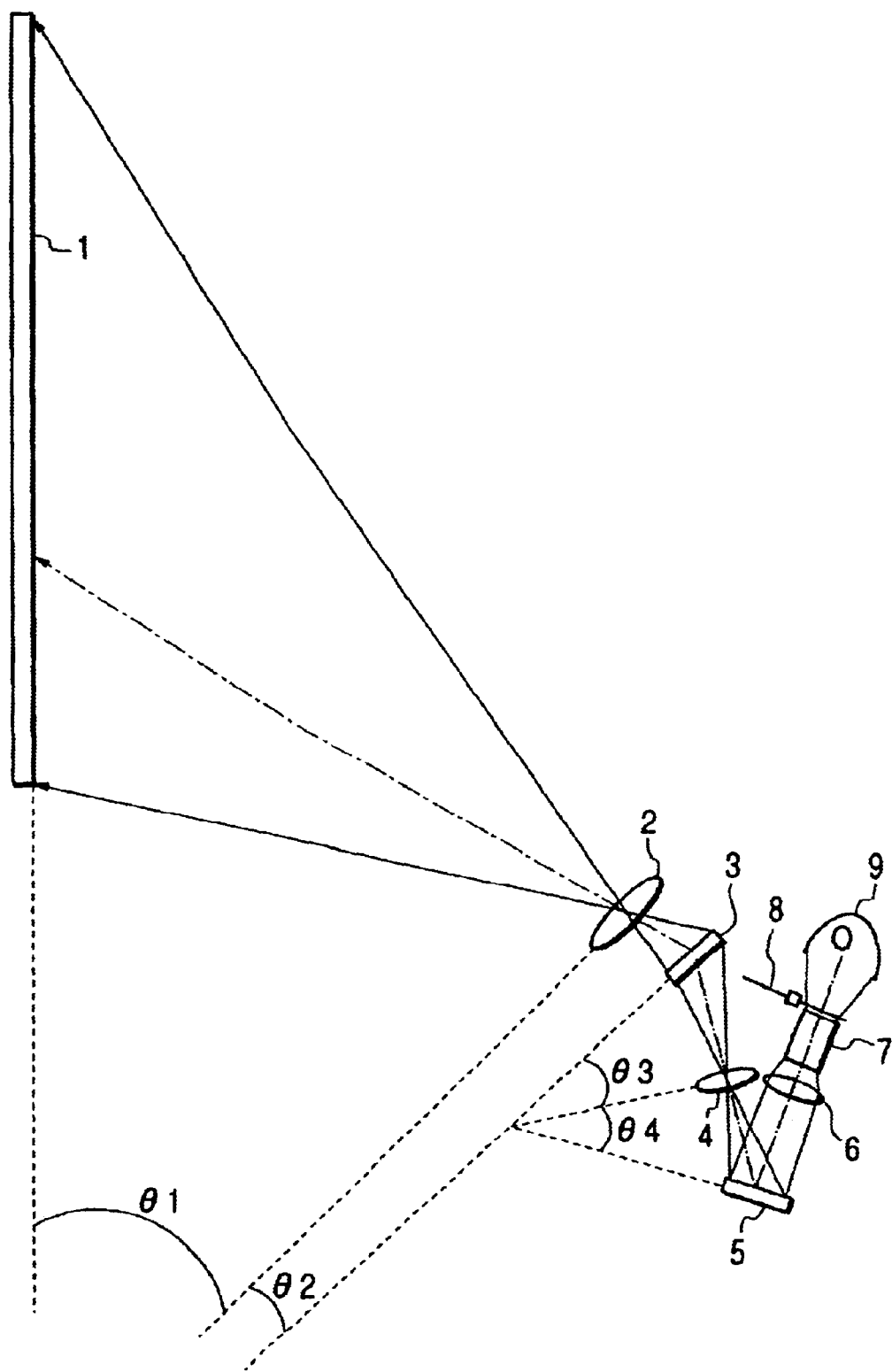
FIG. 1 generally shows a basic optical system for a thin type rear projection display apparatus according to an embodiment of the present invention.

FIG. 1 generally shows a basic optical system for a thin type rear projection display apparatus according to an embodiment of the present invention. In FIG. 1, reference numeral 1 designates a screen for oblique incidence, reference numeral 2 denotes a main projection lens (a second projection optical system), reference numeral 3 designates a transmission type diffracting optical element which is a light deflecting element, reference numeral 4 denotes an auxiliary projection lens (a first projection optical system), reference numeral 5 designates a DMD display device, reference numeral 6 denotes a condensing lens, reference numeral 7 designates a collimator and integrator, reference numeral 8 denotes a rotary color filter, and reference numeral 9 designates a UHP lamp. The reflector of the UHP lamp 9 is of an elliptical type and therefore, light emerging from this lamp is condensed and passes to the rotary color filter 8. The rotation of this rotary color filter 8 is synchronized with the driving of the DMD display device 5, and design is made such that the writing display by each primary color signal and the color light after passed through the rotary color filter 8 coincide in color with each other. Next, the color light passed through the rotary color filter 8 passes through the collimator and integrator 7, whereby the collimation of the light beam and the prevention of uneven illumination are done, and the DMD display device 5 is efficiently illuminated through the condensing lens 6.

Only the display reflected light from the DMD display device 5 passes through the auxiliary projection lens 4, and by the imaging action of this auxiliary projection lens 4, the intermediate projected image thereof is formed on the transmission type diffracting optical element 3. The DMD display device 5 and the transmission type diffracting optical element 3 are tilted relative to the optical axis of the auxiliary projection lens, and the tilt angles $\theta_4$ and $\theta_3$ thereof are set in conformity to the so-called Sheimpflug rule. Accordingly, a trapezoid distorted image is formed on the transmission type diffracting optical element 3, but as in the afore-described example of the prior art, the trapezoid rate thereof is set so as to just cancel trapezoid distortion caused by an oblique projection system onto the screen which will be described later.

Figure 3:
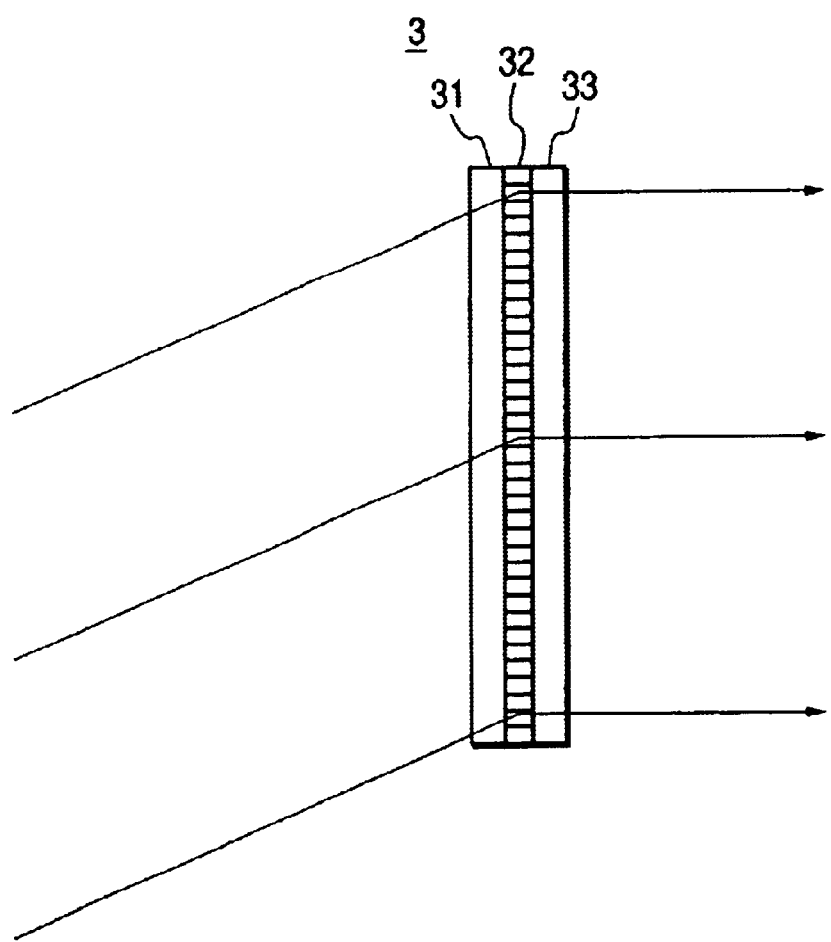
FIG. 3 shows the cross-sectional construction of a hologram transmission type diffracting optical element in the embodiment of the present invention.

Now, the transmission type diffracting optical element 3 has the action of refracting a ray of a predetermined angle of incidence by a predetermined angle, and a light beam passing through and emerging from the transmission type diffracting optical element after having formed the intermediate image has its on-axis ray refracted in the direction of the optical axis of the main projection lens 2, i.e., the direction in which this emergent light beam enters the pupil of the main projection lens 2, by this refracting action. FIG. 3 shows the cross-sectional construction of the transmission type diffracting optical element. This transmission type diffracting optical element is of a construction in which a gelatin layer 32 is sandwiched between glass plates 31 and 33. The gelatin layer forms a hologram which is a diffracting optical element by laser beam exposure, and any ray angle of refraction is set by the setting of the condition of this laser beam exposure. So, in the hologram element 3 used in this embodiment, the ray angle of refraction thereof is set so that as previously described, the emergent light beam may be refracted in the direction in which it enters the pupil of the main projection lens 2.

The ray of light from the intermediate image emerging in the direction of the optical axis of the main projection lens 2 in this manner is efficiently obliquely projected onto the screen 1 through the main projection lens 2. That is, the intermediate image is enlarged and projected onto the screen by the main projection lens 2, but a predetermined rectangular image is displayed on the screen by the trapezoid distortion canceling mechanism as previously described. Also, the screen 1 and the light deflecting element 3 are installed while being tilted with each other relative to the optical axis of the main projection lens 2, and the tilt angles $\theta_2$ and $\theta_1$ thereof are also set in conformity to the Sheimpflug rule.

Figure 2:
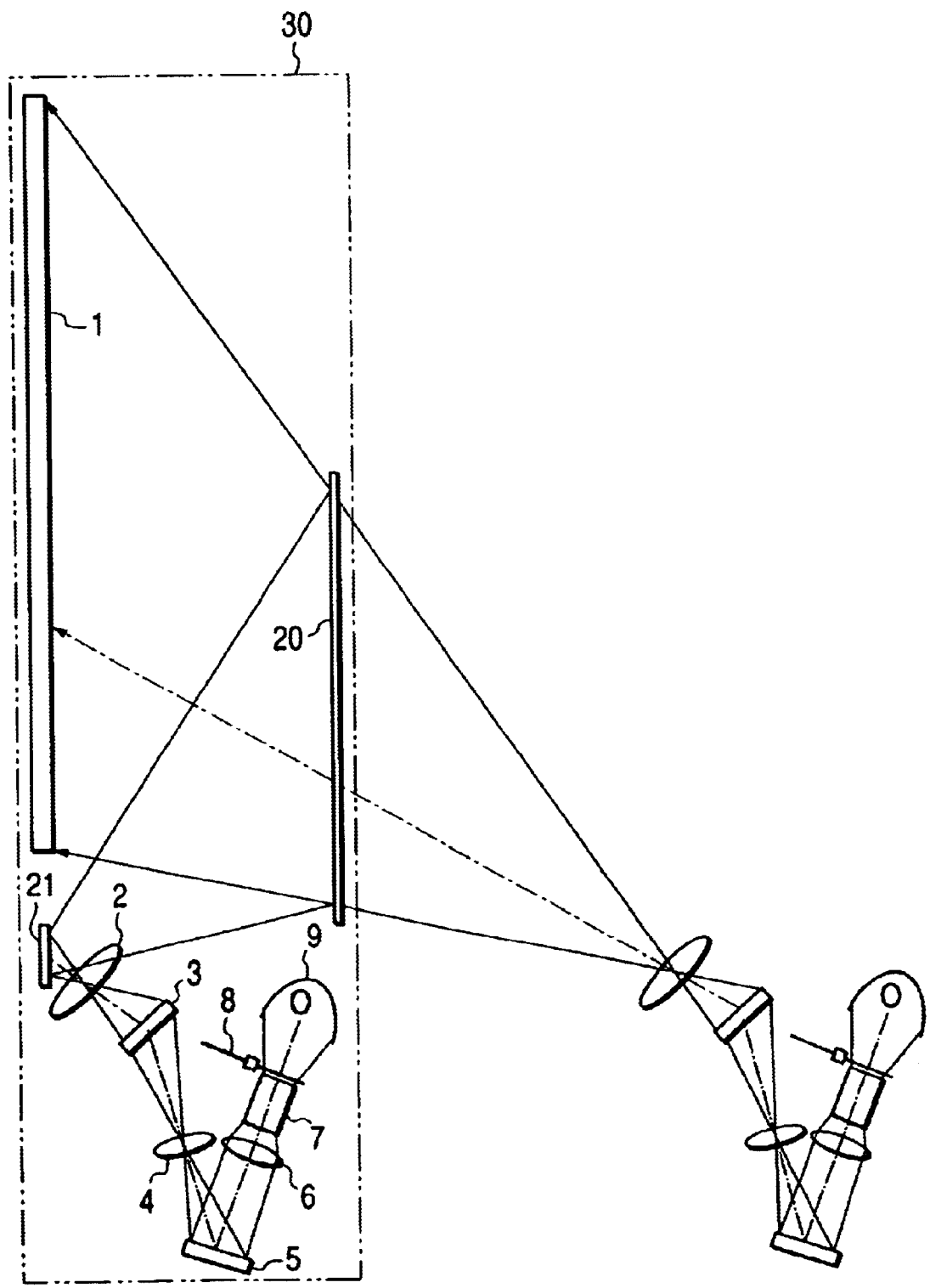
FIG. 2 shows the cross-sectional construction of the thin type rear projection display apparatus according to the embodiment of the present invention.

Next, FIG. 2 shows the cross-sectional construction of the rear projection display apparatus of the present invention contained in a thin type housing by folding the beam of the optical system by mirrors. In FIG. 2, dots-and-dash line indicates the outer configuration of a housing, reference numeral 20 designates a second mirror, and reference numeral 21 denotes a first mirror. Both of these mirrors are plane mirrors, and are vertically disposed. That is, the two mirrors face in a direction in which their reflecting surfaces face each other, and are disposed parallel to each other. The light beam emerging from the projection lens 2 is first reflected by the first mirror 21 located below the screen, and the reflected light beam thereof is further reflected forwardly and upwardly by the second mirror 20 located on the upper side of the rear of the apparatus, and illuminates the screen 1 toward a obliquely upward direction. By thus combining the oblique incidence and the turning-back of the light beam by a plurality of vertically disposed mirrors, the formation of a large image plane rear projection display apparatus of a thin type and good in light utilizing efficiency becomes possible. Incidentally, it is expected that in a display image plane 9:16 long sideways and having a diagonal of 60", a depth of 30 cm becomes possible.

Figure 4:
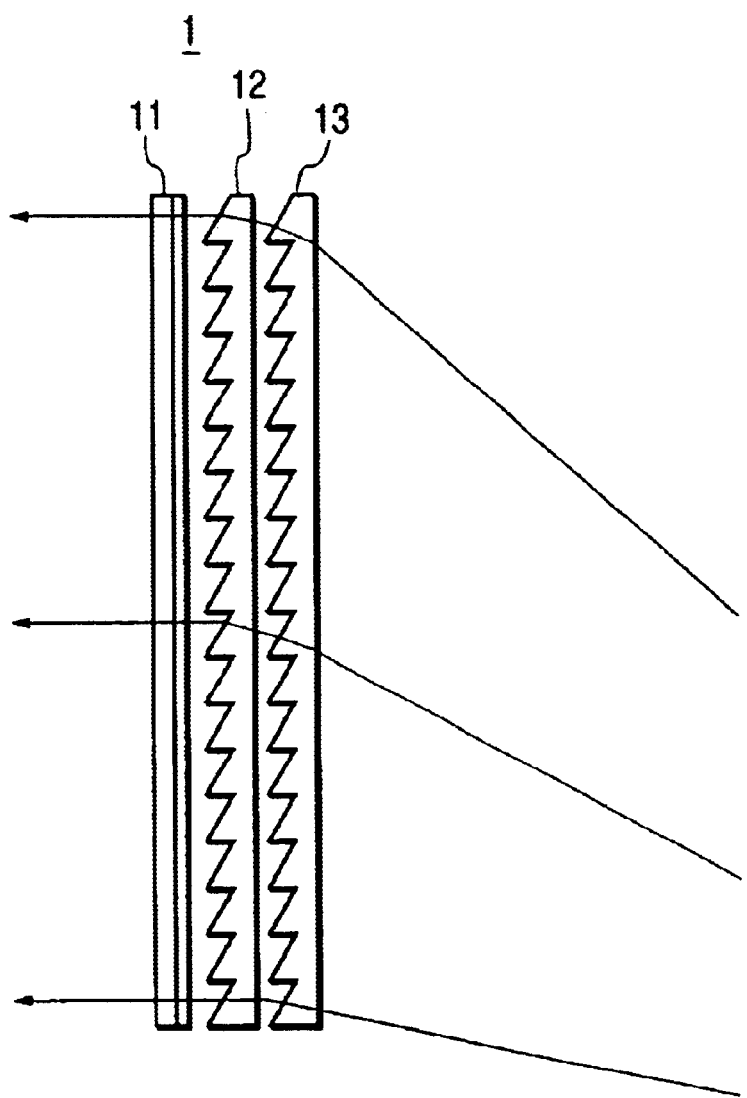
FIG. 4 shows the cross-sectional construction of a screen for coping with oblique incidence in the embodiment of the present invention.

Also, the screen 1 used in the present embodiment is one for oblique incidence, and the cross-sectional construction thereof is shown in FIG. 4. This screen is comprised of three members i.e., an eccentric Fresnel lens 13, an eccentric Fresnel lens 12 and a lenticular lens 11 superposed one upon another in succession from the incidence side. The eccentric Fresnel lenses 12 and 13 are entirely the same in specification. As shown in FIG. 4, the projected light obliquely incident from the back side emerges toward the front over the whole surface by the condensing effect of these two eccentric Fresnel lenses. Further, at this time, the projected light diverges in a horizontal direction (in FIG. 4, a direction perpendicular to the plane of the drawing sheet) by the lenticular lens 11, and a projected image of uniform brightness is thus observed over a wide field of view from the front looking side.

Figure 5:
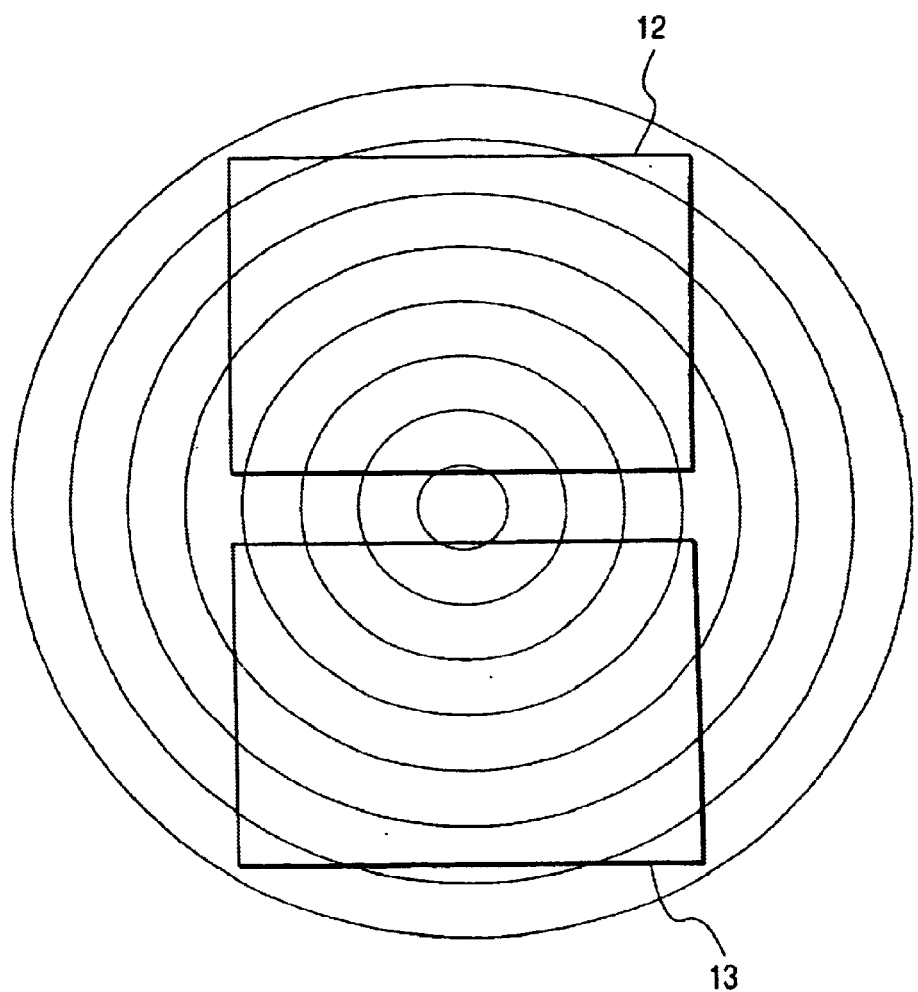
FIG. 5 shows the plan construction of an eccentric Fresnel screen in the embodiment of the present invention.
Figure 6:
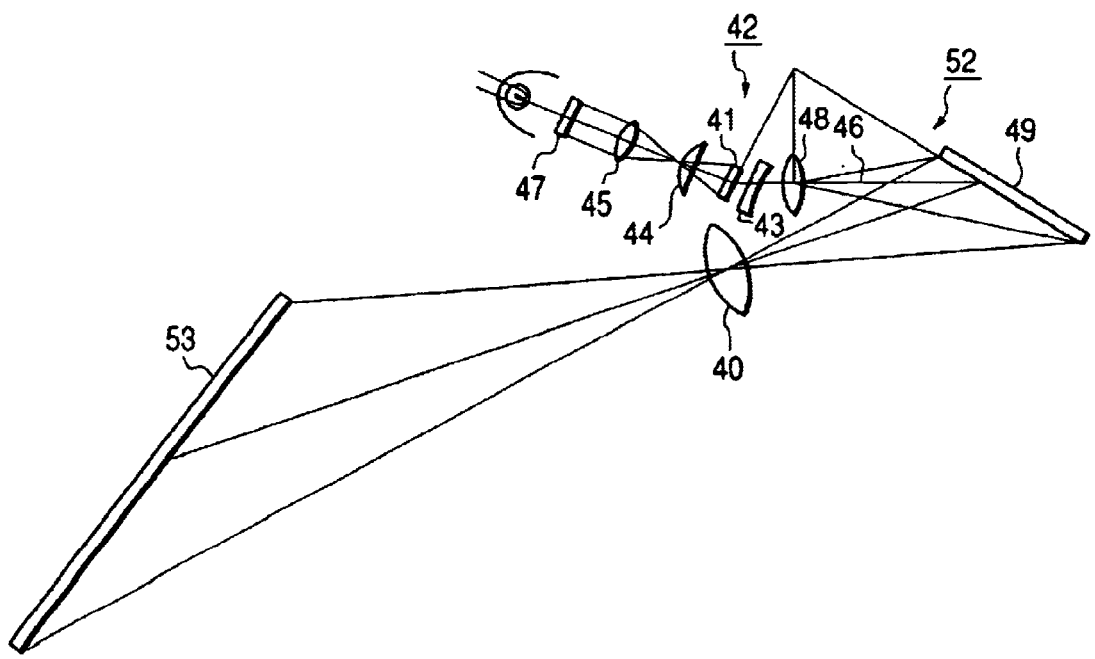
FIG. 6 generally shows an optical system for thin type rear projection according to the prior art.

The plan construction of the ecentric Fresnel lens is shown in FIG. 5. As can be seen from this figure, the eccentric Fresnel lens (elements 12 and 13 as shown in FIG. 5) can be formed by cutting out at a position offset from the center of general concetric circular Frenel.

Now, the above-described construction of the present embodiment is a specific example of the embodiment, and can be variously arranged. For example, in the present embodiment, the intermediate image is formed on the light deflecting element, but the main purpose of canceling trapezoid distortion can be achieved even if the intermediate image is formed in the air near the light deflecting element. Also, while DMD is used as the display device, this is not restrictive, but a thin type rear projection display apparatus can likewise be constructed even if a reflection type or transmission type liquid crystal display device, an organic EL display device, a display device utilizing an electron beam (e.g. a CRT) or the like is utilized.

Also, as the projection system, use may be made, for example, of a curved surface reflecting mirror or the like instead of a lens, with an auxiliary projection system.

Also, if the light deflecting element is constituted by a hologram, not only the light deflecting action but also the light condensing action may be added thereto and a field mirror or lens effect may be imparted thereto, and in this case, the quantity of light around the projected image can be increased. Further, the light deflecting element is not restricted to a hologram element, but may be a diffracting optical element of other type such as a reflection type or a transmission type, or a linear Fresnel plate of fine pitch or the like.

With regard also to the screen construction, it is possible to use a diffusing plate instead of the lenticular lens, and hologram plates or hologram sheets instead of the Fresnel lenses.

What is claimed is:

1. A projection type display apparatus comprising:
    a first projection optical system for obliquely projecting light from an original onto a predetermined plane, said first projection optical system forming an intermediate image of the original on or near said predetermined plane;
    a second projection optical system for obliquely projecting the light from said predetermined plane onto a plane for display; and
    light deflecting means disposed between said first projection optical system and said second projection optical system for deflecting the light emerging from said first projection optical system to the second projection optical system;
    wherein an optical axis of said first projection optical system is deflected by said light deflecting means to substantially coincide with the optical axis of said second projection optical system and tilt angle of said first projection optical system relative to said light deflecting means conforms to a Sheimpflug rule.

2. A projection type display apparatus according to claim 1, wherein said light deflecting means is disposed on said predetermined plane.

3. A projection type display apparatus according to claim 1, wherein said light deflecting means has a transmission type diffractive optical element.

4. A projection type display apparatus according to claim 1, wherein said light deflecting means has a reflection type diffractive optical element.

5. A projection type display apparatus according to claim 1, wherein said light deflecting means is a hologram.

6. A projection type display apparatus according to claim 1, wherein said light deflecting means is disposed at or near the position of said intermediate image.

7. A projection type display apparatus according to claim 1, wherein said plane for display has an eccentric Fresnel lens.

8. A projection type display apparatus according to claim 1, wherein said plane for display has a plurality of eccentric Fresnel lenses.

9. A projection type display apparatus according to claim 1, wherein said plane for display has a lenticular lens.

10. A projection type display apparatus according to claim 1, wherein said light deflecting means has the light deflecting action and the light condensing action.

11. A projection type display apparatus according to claim 1, further comprising a plurality of reflecting mirrors which are so disposed to be parallel with the plane for display.

12. A projection type display apparatus according to claim 1, which is of a rear projection type projecting an image from the rear onto the plane for display.

13. A projection type display apparatus comprising:
    a first projection optical system for obliquely projecting light from an original onto a predetermined plane, said first projection optical system forming an intermediate image of the original on said predetermined plane;
    a second projection optical system for obliquely projecting the light from said predetermined plane onto a plane for display; and
    wherein an optical axis of said first projection optical system is bent by using a diffractive optical element to substantially coincide with an optical axis of said second projection optical system,
    wherein tilt angle of said first projection optical system relative to said diffractive optical element conforms to a Sheimpflug rule.

14. A projection type display apparatus according to claim 13, wherein said diffractive optical element is a hologram.

15. A projection type display apparatus according to claim 13, further comprising at least reflecting mirror which is so disposed as to be parallel with the plane for display in an optical path between the original and the plane for display.

* * * * *